US012672070B2

(12) United States Patent
Ling et al.

(10) Patent No.: US 12,672,070 B2
(45) Date of Patent: Jun. 30, 2026

(54) POWER CONTROL ENHANCEMENT OF PUSCH TRANSMISSION WITH REPETITION

(71) Applicant: Lenovo (Beijing) Limited, Beijing (CN)

(72) Inventors: Wei Ling, Beijing (CN); Chenxi Zhu, Beijing (CN); Bingchao Liu, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 370 days.

(21) Appl. No.: 18/285,154

(22) PCT Filed: Apr. 1, 2021

(86) PCT No.: PCT/CN2021/084800
§ 371 (c)(1),
(2) Date: Sep. 29, 2023

(87) PCT Pub. No.: WO2022/205258
PCT Pub. Date: Oct. 6, 2022

(65) Prior Publication Data
US 2024/0381266 A1 Nov. 14, 2024

(51) Int. Cl.
*H04W 52/14* (2009.01)
*H04W 52/24* (2009.01)

(52) U.S. Cl.
CPC ....... *H04W 52/146* (2013.01); *H04W 52/242* (2013.01)

(58) Field of Classification Search
CPC ............. H04W 52/146; H04W 52/325; H04W 52/242; H04W 52/08; H04W 52/367;
(Continued)

(56) References Cited

U.S. PATENT DOCUMENTS

2019/0261281 A1 8/2019 Jung et al.
2022/0394624 A1* 12/2022 Huang ................... H04W 52/58

FOREIGN PATENT DOCUMENTS

CN 112470513 A 3/2021
WO 2020155179 A1 8/2020
WO 2021054726 A1 3/2021

OTHER PUBLICATIONS

"Extended European Search Report", EP Application No. 21933918. 1, Nov. 18, 2024, 10 pages.
(Continued)

*Primary Examiner* — Tu X Nguyen
(74) *Attorney, Agent, or Firm* — FIG. 1 Patents

(57) ABSTRACT

Methods and apparatuses for power control are disclose. In one embodiment, a method performed at a UE comprises receiving a DCI scheduling a PUSCH transmission with repetitions, a configuration information for the PUSCH transmission with repetitions, and a mapping pattern, wherein, the DCI does not include a SRI field, the configuration information indicates a first SRS resource set and a second SRS resource set that are associated with which SRS resource set each repetition is associated; determining a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index; and transmitting repetitions of the PUSCH transmission associated with the first SRS resource set according to the first power control parameter set, and transmitting repetitions of the PUSCH transmission associated with the second SRS resource set according to the second power control parameter set.

20 Claims, 3 Drawing Sheets

(58) Field of Classification Search
CPC . H04W 52/10; H04W 52/34; H04W 72/0446; H04W 72/046; H04W 52/18; H04W 52/58; H04W 52/04; H04W 52/38; H04W 52/00
See application file for complete search history.

(56) References Cited

OTHER PUBLICATIONS

"Physical layer procedures for control", ETSI TS 138 213 V16.3.0, [retrieved from the internet on Feb. 9, 2025], <https://www.etsi.org/deliver/etsi_ts/138200_138299/138213/16.03.00_60/ts_138213v160300p.pdf>, Nov. 2020, 181 pages.
Moderator (VIVO) , "Summary#2 of [101-e-NR-L1enh-URLLC-InterUE-03]", 3GPP TSG RAN WG1 Meeting #101-e, R1-2004736, e-Meeting [retrieved Nov. 28, 2023]. Retrieved from the Internet <https://www.3gpp.org/ftp/tsg_ran/WG1_RL1/TSGR1_101-e/Docs>, May 2020, 23 pages.
PCT/CN2021/084800 , "International Preliminary Report on Patentability", PCT Application No. PCT/CN2021/084800, Oct. 12, 2023, 6 pages.
PCT/CN2021/084800 , "International Search Report and Written Opinion", PCT Application No. PCT/CN2021/084800, Jan. 6, 2022, 8 pages.
Samsung , "Alignment CR for TS 38.213", 3GPP TSG-RAN WG1 Meeting #103-e, R1-2008124, e-Meeting [retrieved Nov. 28, 2023]. Retrieved from the Internet <https://www.3gpp.org/ftp/tsg_ran/WG1_RL1/TSGR1_103-e/Docs>, Oct. 2020, 31 pages.
VIVO , "Enhancements on Multi-TRP for PDCCH, PUCCH and PUSCH", 3GPP TSG RAN WG1 #104-e, R1-2100422, e-Meeting [retrieved Nov. 28, 2023]. Retrieved from the Internet <https://www.3gpp.org/ftp/tsg_ran/WG1_RL1/TSGR1_104-e/Docs>, Jan. 2021, 28 pages.

* cited by examiner

100

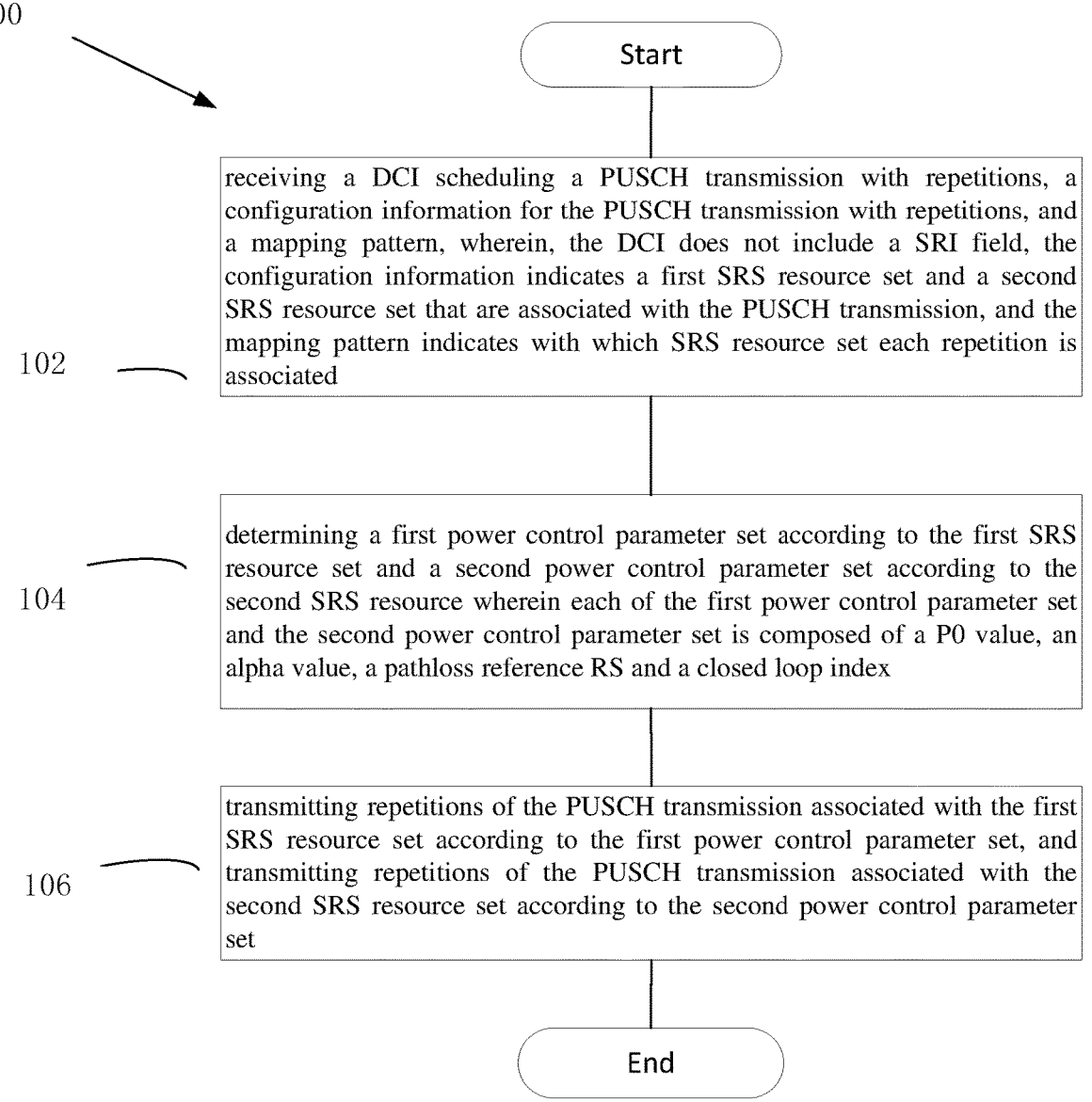

Start

102 receiving a DCI scheduling a PUSCH transmission with repetitions, a configuration information for the PUSCH transmission with repetitions, and a mapping pattern, wherein, the DCI does not include a SRI field, the configuration information indicates a first SRS resource set and a second SRS resource set that are associated with the PUSCH transmission, and the mapping pattern indicates with which SRS resource set each repetition is associated

104 determining a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index

106 transmitting repetitions of the PUSCH transmission associated with the first SRS resource set according to the first power control parameter set, and transmitting repetitions of the PUSCH transmission associated with the second SRS resource set according to the second power control parameter set End

Figure 1

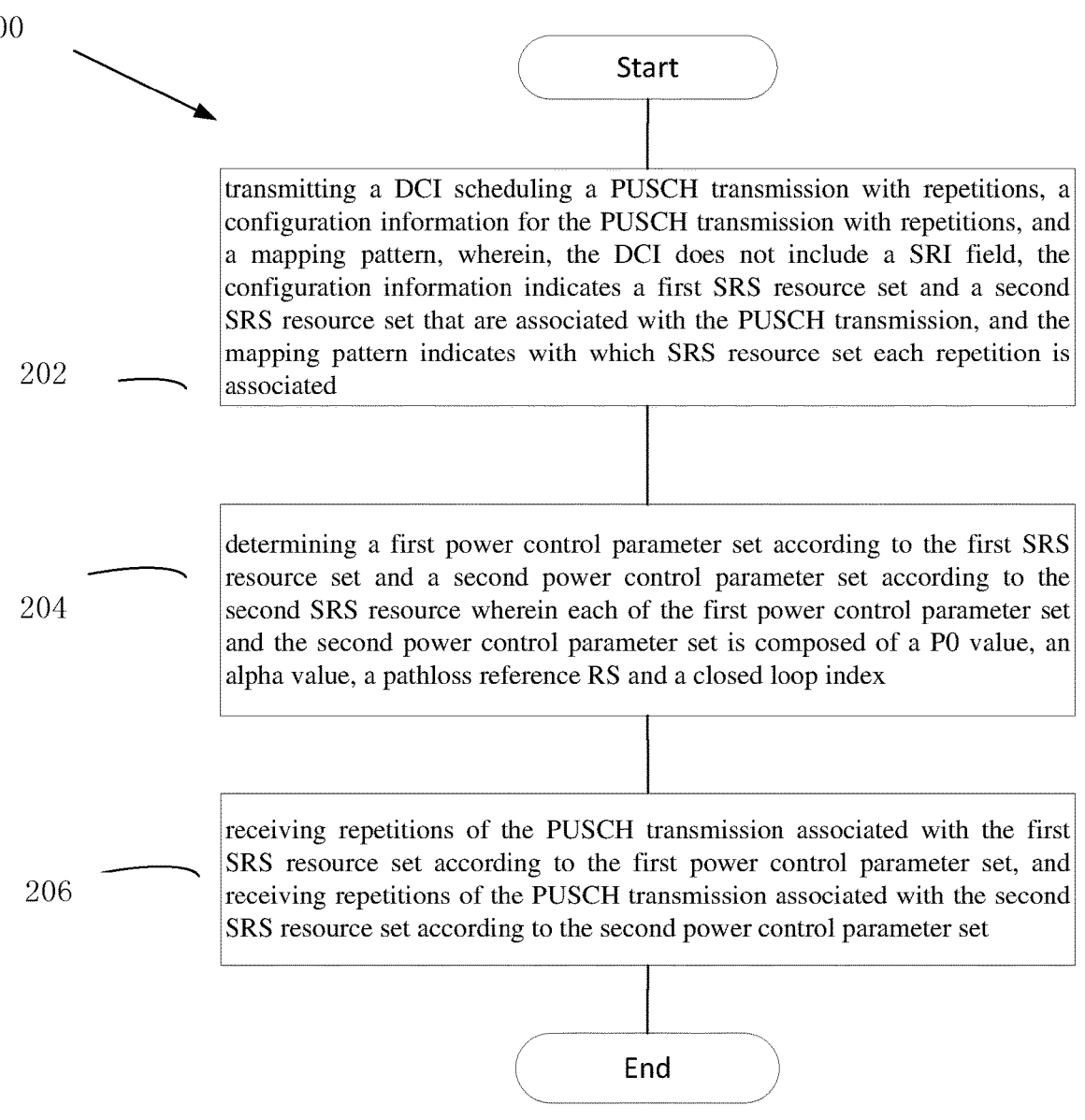

200

Start

202 transmitting a DCI scheduling a PUSCH transmission with repetitions, a configuration information for the PUSCH transmission with repetitions, and a mapping pattern, wherein, the DCI does not include a SRI field, the configuration information indicates a first SRS resource set and a second SRS resource set that are associated with the PUSCH transmission, and the mapping pattern indicates with which SRS resource set each repetition is associated

204 determining a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index

206 receiving repetitions of the PUSCH transmission associated with the first SRS resource set according to the first power control parameter set, and receiving repetitions of the PUSCH transmission associated with the second SRS resource set according to the second power control parameter set End

Figure 2

POWER CONTROL ENHANCEMENT OF PUSCH TRANSMISSION WITH REPETITION

FIELD

The subject matter disclosed herein generally relates to wireless communications, and more particularly relates to methods and apparatuses for power control enhancement of PUSCH transmission with repetition scheduled by control information without SRI field.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), Sounding Reference Signal (SRS), SRS resource indicator (SRI), Downlink Control Information (DCI), Physical Uplink Shared Channel (PUSCH), Reference Signal (RS), transmission reception point (TRP).

In NR release 15, when there is no SRI field in the scheduling DCI of a PUSCH transmission, a power control parameter set composed of a P0 value, an alpha value, a pathloss reference RS index and a closed loop index is predefined. P0 is used to configure the target receive power of gNB. Alpha (0<alpha<=1) is a power compensation factor. Pathloss reference RS is used to indicate a DL RS for the UE for DL pathloss estimation. Closed loop index is used to indicate one index of two close loops. Therefore, the power control parameters of all PUSCH transmissions scheduled by a DCI without SRI field are the same (i.e. they are predefined). However, a PUSCH transmission with repetition is supported in NR Release 17. The PUSCH transmission with repetition is transmitted multiple times to different TRPs (e.g. two TRPs) in different time slots. Therefore, at least two sets of power control parameters should be determined. In particular, all repetitions of the PUSCH transmission associated with (e.g. transmitted to) one TRP are associated with one power control parameter set, while all repetitions of the PUSCH transmission associated with (e.g. transmitted to) the other TRP are associated with the other power control parameter set.

It is yet unknown how to determine two power control parameter sets for the PUSCH transmission with repetition scheduled by a DCI without SRI field. As a whole, the power control of the PUSCH transmission with repetition scheduled by a DCI without SRI field in NR release 17 should be enhanced.

BRIEF SUMMARY

Methods and apparatuses for power control are disclosed.

In one embodiment, a method performed at a UE comprises receiving a DCI scheduling a PUSCH transmission with repetitions, a configuration information for the PUSCH transmission with repetitions, and a mapping pattern, wherein, the DCI does not include a SRI field, the configuration information indicates a first SRS resource set and a second SRS resource set that are associated with the PUSCH transmission, and the mapping pattern indicates with which SRS resource set each repetition is associated; determining a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index; and transmitting repetitions of the PUSCH transmission associated with the first SRS resource set according to the first power control parameter set, and transmitting repetitions of the PUSCH transmission associated with the second SRS resource set according to the second power control parameter set.

In one embodiment, three ways of determining the P0 value and the alpha value are disclosed. In a first way of determining the P0 value and the alpha value, one P0-PUSCH-AlphaSet list is configured; the P0 value and the alpha value of the first power control parameter set are determined by the P0-PUSCH-AlphaSet with the lowest Id in the one P0-PUSCH-AlphaSet list; and the P0 value and the alpha value of the second power control parameter set are also determined by the P0-PUSCH-AlphaSet with the lowest Id in the one P0-PUSCH-AlphaSet list. In a second way of determining the P0 value and the alpha value, a first P0-PUSCH-AlphaSet list and a second P0-PUSCH-AlphaSet list are configured; the first P0-PUSCH-AlphaSet list is associated with one of the first SRS resource set and the second SRS resource set, and the second P0-PUSCH-AlphaSet list is associated with the other of the first SRS resource set and the second SRS resource set; the P0 value and the alpha value of the first power control parameter set are determined by the P0-PUSCH-AlphaSet with the lowest Id in the P0-PUSCH-AlphaSet list associated with the first SRS resource set; and the P0 value and the alpha value of the second power control parameter set are determined by P0-PUSCH-AlphaSet with the lowest Id in the P0-PUSCH-AlphaSet list associated with the second SRS resource set. In a third way of determining the P0 value and the alpha value, one P0-PUSCH-AlphaSet list is configured; each P0-PUSCH-AlphaSet in the one P0-PUSCH-AlphaSet list is associated with one of the first SRS resource set and the second SRS resource set; the P0 value and the alpha value of the first power control parameter set are determined by the P0-PUSCH-AlphaSet with the lowest Id associated with the first SRS resource set; and the P0 value and the alpha value of the second power control parameter set are determined by the P0-PUSCH-AlphaSet with the lowest Id associated with the second SRS resource set.

In another embodiment, six ways of determining pathloss reference RS are disclosed. In a first way of determining pathloss reference RS, when PUSCH-PathlossReferenceRS is configured and enableDefaultBeamPL-ForSRS-r16 is not configured, a first PUSCH-PathlossReferenceRS list and a second PUSCH-PathlossReferenceRS list are configured; the first PUSCH-PathlossReferenceRS list is associated with one of the first SRS resource set and the second SRS resource set, and the second PUSCH-PathlossReferenceRS list is associated with the other of the first SRS resource set and the second SRS resource set; the PUSCH-PathlossReferenceRS with Id value being equal to zero in the PUSCH-PathlossReferenceRS list associated with the first SRS resource set is determined as the pathloss reference RS of the first power control parameter set; and the PUSCH-Pathloss- ReferenceRS with Id value being equal to zero in the PUSCH-PathlossReferenceRS list associated with the second SRS resource set is determined as the pathloss reference RS of the second power control parameter set. In a second way of determining pathloss reference RS, when PUSCH-PathlossReferenceRS is configured and enableDefault-BeamPL-ForSRS-r16 is not configured, one PUSCH-PathlossReferenceRS list is configured; each PUSCH-PathlossReferenceRS in the one PUSCH-PathlossReferenceRS list is associated with one of the first SRS resource set and the second SRS resource set; the PUSCH-PathlossReferenceRS with the lowest Id associated with the first SRS resource set is determined as the pathloss reference RS of the first power control parameter set; and the PUSCH-PathlossReferenceRS with the lowest Id associated with the second SRS resource set is determined as the pathloss reference RS of the second power control parameter set. In a third way of determining pathloss reference RS, when PUSCH-PathlossReferenceRS and PUSCH-Pathloss-ReferenceRS-r16 are not configured and enableDefault-BeamPL-ForSRS-r16 is configured, one pathloss reference RS is configured for each of the first SRS resource set and the second SRS resource set; the pathloss reference RS configured for the first SRS resource set is determined as the pathloss reference RS of the first power control parameter set; and the pathloss reference RS configured for the second SRS resource set is determined as the pathloss reference RS of the second power control parameter set. In a fourth way of determining pathloss reference RS, when enablePLRS-UpdateForPUSCH-SRS-r16 is configured, two SRI-PUSCH-PowerControl lists are configured; each SRI-PUSCH-PowerControl list is associated with one of the first SRS resource set and the second SRS resource set; a RS resource whose PUSCH-PathlossReferenceRS-Id is mapped to the SRI-PUSCH-PowerControl with Id value being equal to zero in the SRI-PUSCH-PowerControl list associated with the first SRS resource set is determined as the pathloss reference RS of the first power control parameter set; and a RS resource whose PUSCH-PathlossReferenceRS-Id is mapped to the SRI-PUSCH-PowerControl with Id value being equal to zero in the SRI-PUSCH-PowerControl list associated with the second SRS resource set is determined as the pathloss reference RS of the second power control parameter set. In a fifth way of determining pathloss reference RS, when enablePLRS-UpdateForPUSCH-SRS-r16 is configured, one SRI-PUSCH-PowerControl list is configured; each SRI-PUSCH-PowerControl in the one SRI-PUSCH-PowerControl list is associated with one of the first SRS resource set and the second SRS resource set; a RS resource whose PUSCH-PathlossReferenceRS-Id is mapped to the SRI-PUSCH-PowerControl with the lowest Id associated with the first SRS resource set is determined as the pathloss reference RS of the first power control parameter set; and a RS resource whose PUSCH-PathlossReferenceRS-Id is mapped to the SRI-PUSCH-PowerControl with the lowest Id associated with the second SRS resource set is determined as the pathloss reference RS of the second power control parameter set. In a sixth way of determining pathloss reference RS, when enablePLRS-UpdateForPUSCH-SRS-r16 is configured, one SRI-PUSCH-PowerControl list is configured; two SRI-PUSCH-PathlossReferenceRS Ids are configured for each SRI-PUSCH-PowerControl in the one SRI-PUSCH-PowerControl list; each SRI-PUSCH-Path-lossReferenceRS Id is associated with one of the first SRS resource set and the second SRS resource set; a RS resource whose PUSCH-PathlossReferenceRS-Id is mapped to the SRI-PUSCH-PathlossReferenceRS of the SRI-PUSCH- PowerControl with Id value being equal to zero associated with the first SRS resource set is determined as the pathloss reference RS of the first power control parameter set; and a RS resource whose PUSCH-PathlossReferenceRS-Id is mapped to the SRI-PUSCH-PathlossReferenceRS of the SRI-PUSCH-PowerControl with Id value being equal to zero associated with the second SRS resource set is determined as the pathloss reference RS of the second power control parameter set.

In some embodiment, one way of determining the closed loop index is disclosed: the closed loop index of the first power control parameter set is a closed loop index associated with the first SRS resource set; and the closed loop index of the second power control parameter set is a closed loop index associated with the second SRS resource set that is different from the closed loop index associated with the first SRS resource set.

In another embodiment, a UE comprises a receiver that receives a DCI scheduling a PUSCH transmission with repetitions, wherein the DCI does not include a SRI field, receives a configuration information for the PUSCH transmission with repetitions, wherein the configuration information indicates a first SRS resource set and a second SRS resource set that are associated with the PUSCH transmission, and receives a mapping pattern that indicates with which SRS resource set each repetition is associated; a processor that determines a first power control parameter set according to the first SRS resource set and a second power control parameter set according to the second SRS resource set, wherein each of the first power control parameter set and the second power control parameter set is composed of a P0 value, an alpha value, a pathloss reference RS and a closed loop index; and a transmitter that transmits repetitions of the PUSCH transmission associated with the first SRS resource set according to the first power control parameter set, and transmits repetitions of the PUSCH transmission associated with the second SRS resource set according to the second power control parameter set.

In one embodiment, a base unit comprises a transmitter that transmits a DCI scheduling a PUSCH transmission with repetitions, wherein the DCI does not include a SRI field, transmits a configuration information for the PUSCH transmission with repetitions, wherein the configuration information indicates a first SRS resource set and a second SRS resource set that are associated with the PUSCH transmission, and transmits a mapping pattern that indicates with which SRS resource set each repetition is associated; a processor that determines a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index; and a receiver that receives repetitions of the PUSCH transmission associated with the first SRS resource set according to the first power control parameter set, and receives repetitions of the PUSCH transmission associated with the second SRS resource set according to the second power control parameter set.

In yet another embodiment, a method performed at base unit comprises transmitting a DCI scheduling a PUSCH transmission with repetitions, a configuration information for the PUSCH transmission with repetitions, and a mapping pattern, wherein, the DCI does not include a SRI field, the configuration information indicates a first SRS resource set and a second SRS resource set that are associated with the PUSCH transmission, and the mapping pattern indicates with which SRS resource set each repetition is associated; determining a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index; and receiving repetitions of the PUSCH transmission associated with the first SRS resource set according to the first power control parameter set, and receiving repetitions of the PUSCH transmission associated with the second SRS resource set according to the second power control parameter set.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 1 is a schematic flow chart diagram illustrating an embodiment of a method;

FIG. 2 is a schematic flow chart diagram illustrating a further embodiment of a method.

DETAILED DESCRIPTION

Figure 3:
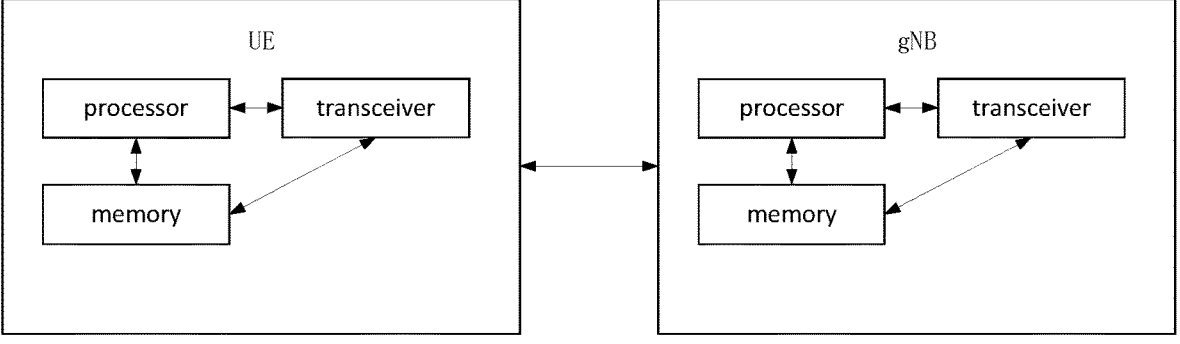
FIG. 3 is a schematic block diagram illustrating apparatuses according to one embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

As agreed in NR Release 17, two SRS resource sets will be configured for a PUSCH transmission with repetition for two TRPs, where each of the two SRS resource sets is associated with one TRP of the two TRPs. Both of the two SRS resource sets are configured with usage of either 'codebook' or 'non-codebook'. For ease of discussion, in the following description, each SRS resource set configured with usage of either 'codebook' or 'non-codebook' is abbreviated as SRS resource set. Therefore, a PUSCH transmission with repetition in NR Release 17 scheduled by a DCI that doesn't have an SRI field is associated with two SRS resource sets (e.g. a SRS resource set with lower index, and a SRS resource set with higher index). In addition, a mapping pattern is configured to indicate with which SRS resource set (e.g. either SRS resource set with lower index or the SRS resource set with higher index) each repetition is associated with.

The PUSCH transmission with repetition has multiple repetitions, e.g. 4 repetitions. Each repetition is associated with one of the two SRS resource sets according to a rule. The rule can be predefined, or configured by a RRC signaling, or indicated in the DCI scheduling the PUSCH transmission with repetition. As a matter of fact, the mapping pattern of the repetitions with the SRS resource sets is predefined. For example, in scenario of 4 repetitions, the first two repetitions can be associated with one of the two SRS resource sets, while the last two repetitions can be associated with the other of the two SRS resource sets. However, it should be determined which of the two SRS resource sets is associated with the first two repetitions and which of the two SRS resource sets is associated with the last two repetitions. In view of the above, it is practical to indicate with which of the two SRS resource sets a first repetition is associated. For example, the first repetition may be always associated with one SRS resource set, e.g. the SRS resource set with lower index of the two SRS resource sets. Alternatively, the SRS resource set with which the first repetition is associated may be configured by a RRC signaling, or indicated in the DCI scheduling the PUSCH transmission with repetition.

According to the present disclosure, two power control parameter sets should be determined for a PUSCH transmission with repetition when there is no SRI field in the DCI scheduling the PUSCH transmission with repetition. Since the PUSCH transmission with repetition is associated with two SRS resource sets, the UL transmit power of all the repetitions associated with one SRS resource set of the two SRS resource sets is determined according to one power control parameter set, and the UL transmit power of all the repetitions associated with the other SRS resource set of the two SRS resource sets is determined according to the other power control parameter set. Therefore, each power control parameter set of the two power control parameter sets is associated with a different SRS resource set of the two SRS resource sets. For ease of discussion, in the following description, the power control parameter set associated with the SRS resource set with lower index is named as power control parameter set 0, while the power control parameter set associated with the SRS resource set with higher index is named as power control parameter set 1.

As a matter of fact, a power control parameter set includes four parameters: one P0 value, one alpha value, one pathloss reference RS and one closed loop index. The determination of the four parameters of each of the two power control parameter sets (i.e. power control parameter set 0 and power control parameter set 1) will be discussed in detail.

1. P0 Value and Alpha Value:

P0 is used to configure the target receive power of gNB. Alpha (0<alpha<=1) is the power compensation factor. P0 value and alpha value can be determined together. This disclosure proposes two different methods for determining two P0 values and two alpha values.

Method 1 of Determining P0 Value and Alpha Value:

One P0 value and one alpha value are determined for the two power control parameter sets (i.e. power control parameter set 0 and power control parameter set 1). It means that the P0 values of the two power control parameter sets are the same, and the alpha values of the two power control parameter sets are also the same.

The one P0 value and the one alpha value can be determined by the P0-PUSCH-AlphaSet with the lowest Id in a P0-PUSCH-AlphaSet list.

The determined P0 value and alpha value apply to all repetitions of the PUSCH transmission that are associated with either power control parameter set 0 or power control parameter set 1.

For example, as shown in Table 1, a P0-PUSCH-AlphaSet list (e.g. P0-PUSCH-AlphaSet list 0) consists of P0-PUSCH-AlphaSets with Ids 0, 1, 2 and 3. The one P0 value and the one alpha value are determined by P0-PUSCH-AlphaSet 0 (i.e. the P0-PUSCH-AlphaSet with the lowest Id) in P0-PUSCH-AlphaSet list 0.

TABLE 1

| P0-PUSCH-AlphaSet list 0 |
| --- |
| P0-PUSCH-AlphaSet 0 |
| P0-PUSCH-AlphaSet 1 |
| P0-PUSCH-AlphaSet 2 |
| P0-PUSCH-AlphaSet 3 |

Method 2 of Determining P0 Value and Alpha Value:

In Method 2, two P0 values and two alpha values are determined for the two power control parameter sets. It means the P0 values of two power control parameter sets are different, and the alpha values of the two power control parameter sets are also different.

Two P0 values and two alpha values can be determined with two options.

Option 1 of Determining Two P0 Values and Two Alpha Values in Method 2:

Two P0-PUSCH-AlphaSet lists (e.g. P0-PUSCH-AlphaSet list 0 and P0-PUSCH-AlphaSet list 1) are configured. Each P0-PUSCH-AlphaSet list is associated with one SRS resource set (e.g. a SRS resource set with lower index, or a SRS resource set with higher index) of the two SRS resource sets, either according to a predefined rule or configured by a RRC signaling. For example, P0-PUSCH-AlphaSet list 0 can be associated with the SRS resource set with lower index while P0-PUSCH-AlphaSet list 1 is associated with the SRS resource set with higher index. The P0 value and the alpha value of power control parameter set 0 are determined by P0-PUSCH-AlphaSet with the lowest Id in P0-PUSCH-AlphaSet list 0, and the P0 value and the alpha value of power control parameter set 1 are determined by P0-PUSCH-AlphaSet with the lowest Id in P0-PUSCH-AlphaSet list 1.

For example, as shown in Table 2, P0-PUSCH-AlphaSet list 0, which is associated with the SRS resource set with lower index, consists of P0-PUSCH-AlphaSets with Ids 00, 01, 02 and 03, while P0-PUSCH-AlphaSet list 1, which is associated with the SRS resource set with higher index, consists of P0-PUSCH-AlphaSets with Ids 10, 11, 12 and 13. The P0 value and the alpha value of power control parameter set 0 are determined by P0-PUSCH-AlphaSet 00 (i.e. P0-PUSCH-AlphaSet with the lowest Id in P0-PUSCH-AlphaSet list 0), and the P0 value and the alpha value of power control parameter set 1 are determined by P0-PUSCH-AlphaSet 10 (P0-PUSCH-AlphaSet with the lowest Id in P0-PUSCH-AlphaSet list 1).

TABLE 2

| P0-PUSCH-AlphaSet list-associated with SRS resource set with lower index | P0-PUSCH-AlphaSet list-associated with SRS resource set with higher index |
| --- | --- |
| P0-PUSCH-AlphaSet 00 | P0-PUSCH-AlphaSet 10 |
| P0-PUSCH-AlphaSet 01 | P0-PUSCH-AlphaSet 11 |
| P0-PUSCH-AlphaSet 02 | P0-PUSCH-AlphaSet 12 |
| P0-PUSCH-AlphaSet 03 | P0-PUSCH-AlphaSet 13 |

Option 2 of Determining Two P0 Values and Two Alpha Values in Method 2:

One P0-PUSCH-AlphaSet list (e.g. P0-PUSCH-AlphaSet list 0) is configured. Each P0-PUSCH-AlphaSet in the P0-PUSCH-AlphaSet list is associated with one SRS resource set (e.g. a SRS resource set with lower index, or a SRS resource set with higher index) of the two SRS resource sets. The P0 value and the alpha value of power control parameter set 0 are determined by the P0-PUSCH-AlphaSet with the lowest Id associated with the SRS resource set with lower index, and the P0 value and the alpha value of power control parameter set 1 are determined by the P0-PUSCH-AlphaSet with the lowest Id associated with the SRS resource set with higher index.

For example, as shown in Table 3, the P0-PUSCH-AlphaSet list (e.g. P0-PUSCH-AlphaSet list 0) consists of P0-PUSCH-AlphaSets with Ids 0, 1, 2, 3, 4, 5, 6, and 7, while P0-PUSCH-AlphaSets 0, 1, 3, and 5 are associated with the SRS resource set with lower index, and P0-PUSCH-AlphaSets 2, 4, 6 and 7 are associated the SRS resource set with higher index. The P0 value and the alpha value of power control parameter set 0 are determined by P0-PUSCH-AlphaSet 0 (i.e. the P0-PUSCH-AlphaSet with the lowest Id associated with the SRS resource set with lower index), and the P0 value and the alpha value of power control parameter set 1 are determined by P0-PUSCH-AlphaSet 2 (i.e. the P0-PUSCH-AlphaSet with the lowest Id associated with the SRS resource set with higher index).

TABLE 3

| P0-PUSCH-AlphaSet list 0 | |
| --- | --- |
| P0-PUSCH-AlphaSet 0 | associated with SRS resource set with lower index |

TABLE 3-continued

| P0-PUSCH-AlphaSet list 0 | |
| --- | --- |
| P0-PUSCH-AlphaSet 1 | associated with SRS resource set with lower index |
| P0-PUSCH-AlphaSet 2 | associated with SRS resource set with higher index |
| P0-PUSCH-AlphaSet 3 | associated with SRS resource set with lower index |
| P0-PUSCH-AlphaSet 4 | associated with SRS resource set with higher index |
| P0-PUSCH-AlphaSet 5 | associated with SRS resource set with lower index |
| P0-PUSCH-AlphaSet 6 | associated with SRS resource set with higher index |
| P0-PUSCH-AlphaSet 7 | associated with SRS resource set with higher index |

2. Pathloss Reference RS

Pathloss reference RS is used to indicate a DL RS for the UE for DL pathloss estimation. This disclosure proposes different methods for three different cases.

Case 1: PUSCH-PathlossReferenceRS is configured and enableDefaultBeamPL-ForSRS-r16 is not configured.

In Case 1, the pathloss reference RS is determined according to the configured PUSCH-PathlossReferenceRS according to the NR Release 15 specification. This disclosure proposes two different methods for determining pathloss reference RS in Case 1.

Option 1 of Determining Pathloss Reference RS in Case 1:

Two PUSCH-PathlossReferenceRS lists (e.g. PUSCH-PathlossReferenceRS list 0 and PUSCH-PathlossReferenceRS list 1) are configured. Each PUSCH-PathlossReferenceRS list is associated with one SRS resource set (e.g. a SRS resource set with lower index, or a SRS resource set with higher index) of the two SRS resource sets, either according to a predefined rule or configured by a RRC signaling. For example, PUSCH-PathlossReferenceRS list 0 is associated with the SRS resource set with lower index while PUSCH-PathlossReferenceRS list 1 is associated with the SRS resource set with higher index. PUSCH-PathlossReferenceRS with Id value being equal to zero in PUSCH-PathlossReferenceRS list 0 is determined as the pathloss reference RS of power control parameter set 0, while PUSCH-PathlossReferenceRS with Id value being equal to zero in PUSCH-PathlossReferenceRS list 1 is determined as the pathloss reference RS of power control parameter set 1.

For example, as shown in Table 4, PUSCH-PathlossReferenceRS list 0, which is associated with SRS resource set with lower index, consists of PUSCH-PathlossReferenceRSs 0, 1, 2 and 3, while PUSCH-PathlossReferenceRS list 1, which is associated with SRS resource set with higher index, consists of extra PUSCH-PathlossReferenceRSs 0, 1, 2 and 3. PUSCH-PathlossReferenceRS 0 (i.e. PUSCH-PathlossReferenceRS with Id value being equal to zero in PUSCH-PathlossReferenceRS list 0) is determined as the pathloss reference RS of power control parameter set 0, while extra PUSCH-PathlossReferenceRS 0 (i.e. PUSCH-PathlossReferenceRS with Id value being equal to zero in PUSCH-PathlossReferenceRS list 1) is determined as the pathloss reference RS of power control parameter set 1.

TABLE 4

| PUSCH-PathlossReferenceRS list 0-associated with SRS resource set with lower index | PUSCH-PathlossReferenceRS list 1-associated with SRS resource set with higher index |
| --- | --- |
| PUSCH-PathlossReferenceRS 0 | extra PUSCH-PathlossReferenceRS 0 |
| PUSCH-PathlossReferenceRS 1 | extra PUSCH-PathlossReferenceRS 1 |

TABLE 4-continued

| PUSCH-PathlossReferenceRS list 0-associated with SRS resource set with lower index | PUSCH-PathlossReferenceRS list 1-associated with SRS resource set with higher index |
| --- | --- |
| PUSCH-PathlossReferenceRS 2 | extra PUSCH-PathlossReferenceRS 2 |
| PUSCH-PathlossReferenceRS 3 | extra PUSCH-PathlossReferenceRS 3 |

Option 2 of Determining Pathloss Reference RS in Case 1:

Only one PUSCH-PathlossReferenceRS list (e.g. PUSCH-PathlossReferenceRS list 0) is configured. Each PUSCH-PathlossReferenceRS in the PUSCH-PathlossReferenceRS list is associated with one SRS resource set (e.g. a SRS resource set with lower index, or a SRS resource set with higher index) of the two SRS resource sets. PUSCH-PathlossReferenceRS with the lowest Id associated with the SRS resource set with lower index in the one PUSCH-PathlossReferenceRS list is determined as the pathloss reference RS of power control parameter set 0, and PUSCH-PathlossReferenceRS with the lowest Id associated with the SRS resource set with higher index in the one PUSCH-PathlossReferenceRS list is determined as the pathloss reference RS of power control parameter set 1.

For example, as shown in Table 5, PUSCH-PathlossReferenceRS list 0 consists of PUSCH-PathlossReferenceRSs with Ids 0, 1, 2, 3, 4, 5, 6 and 7, while PUSCH-PathlossReferenceRSs with Ids 0, 1, 2 and 3 are associated with the SRS resource set with lower index, and PUSCH-PathlossReferenceRSs with Ids 4, 5, 6 and 7 are associated with the SRS resource set with higher index. PUSCH-PathlossReferenceRS 0 (i.e. the PUSCH-PathlossReferenceRS with the lowest Id associated with the SRS resource set with lower index) in PUSCH-PathlossReferenceRS list 0 is determined as the pathloss reference RS of power control parameter set 0. PUSCH-PathlossReferenceRS 4 (i.e. the PUSCH-PathlossReferenceRS with the lowest Id associated with SRS resource set with higher index) in PUSCH-PathlossReferenceRS list 0 is determined as the pathloss reference RS of power control parameter set 1.

TABLE 5

| PUSCH-PathlossReferenceRS list 0 | |
| --- | --- |
| PUSCH-PathlossReferenceRS 0 | associated with SRS resource set with lower index |
| PUSCH-PathlossReferenceRS 1 | associated with SRS resource set with lower index |
| PUSCH-PathlossReferenceRS 2 | associated with SRS resource set with lower index |
| PUSCH-PathlossReferenceRS 3 | associated with SRS resource set with lower index |
| PUSCH-PathlossReferenceRS 4 | associated with SRS resource set with higher index |
| PUSCH-PathlossReferenceRS 5 | associated with SRS resource set with higher index |
| PUSCH-PathlossReferenceRS 6 | associated with SRS resource set with higher index |
| PUSCH-PathlossReferenceRS 7 | associated with SRS resource set with higher index |

Case 2: PUSCH-PathlossReferenceRS and PUSCH-PathlossReferenceRS-r16 are not configured and enableDefaultBeamPL-ForSRS-r16 is configured.

In Case 2, the pathloss reference RS is determined as the pathloss reference RS of the SRS resource set associated with a PUSCH transmission according to the NR Release 16 specification. Two SRS resource sets (e.g. SRS resource set with lower index, and SRS resource set with higher index) are associated with the PUSCH transmission with repetition. One pathloss reference RS is configured for each SRS resource set. That is, two pathloss reference RSs are configured for the two SRS resource sets. Therefore, the pathloss reference RS of power control parameter set 0 may be the pathloss reference RS configured for one SRS resource set (e.g. the SRS resource set with lower index) of the two SRS resource sets, while the pathloss reference RS of power control parameter set 1 may be the pathloss reference RS configured for the other SRS resource set (e.g. the SRS resource set with higher index) of the two SRS resource sets. Therefore, for example, the pathloss reference RS of all repetitions associated with the SRS resource set with lower index is the pathloss reference RS configured for the SRS source set with lower index, and the pathloss reference RS of all repetitions associated with the SRS resource set with higher index is the pathloss reference RS configured for the SRS source set with higher index.

For example, as shown in Table 6, pathloss reference RS 0 is configured for the SRS resource set with lower index, while pathloss reference RS 1 is configured for the SRS resource set with higher index. The pathloss reference RS of power control parameter set 0 is pathloss reference RS 0, and the pathloss reference RS of power control parameter set 1 is pathloss reference RS 1.

TABLE 6

| SRS resource set with lower index | SRS resource set with higher index |
| --- | --- |
| pathloss reference RS 0 | pathloss reference RS 1 |

Case 3: enablePLRS-UpdateForPUSCH-SRS-r16 is configured.

The pathloss reference RS is determined by SRI-PUSCH-PowerControlId=in NR Release 16, and there are at least three alternative ways of linking SRI field to two power control parameters.

Alternative 1: Add second SRI-PUSCH-MappingToAddModList, and select two SRI-PUSCH-PowerControl from two SRI-PUSCH-MappingToAddModList.

Alternative 2: Add SRS resource set ID in SRI-PUSCH-PowerControl, and select SRI-PUSCH-PowerControl from SRI-PUSCH-MappingToAddModList considering the SRS resource set ID.

Alternative 3: Add second SRI-PUSCH-PathlossReferenceRS-Id or sri-P0-PUSCH-AlphaSetId or SRI-PUSCH-ClosedLoopIndex in SRI-PUSCH-PowerControl.

Option 1 of Determining Pathloss Reference RS in Case 3:

According to Alternative 1, two SRI-PUSCH-PowerControl lists (e.g. SRI-PUSCH-PowerControl list 0 and SRI-PUSCH-PowerControl list 1) are configured for a PUSCH transmission with repetition. Each SRI-PUSCH-PowerControl list is associated with one SRS resource set (e.g. a SRS resource set with lower index, or a SRS resource set with higher index) of the two SRS resource sets, either according to a predefined rule or configured by a RRC signaling. For example, SRI-PUSCH-PowerControl list 0 may be associated with one SRS resource set (e.g. the SRS resource set with lower index), and SRI-PUSCH-PowerControl list 1 is associated with the other SRS resource set (e.g. the SRS resource set with higher index). The RS resource whose PUSCH-PathlossReferenceRS-Id is mapped to the SRI-PUSCH-PowerControl with Id=0 in SRI-PUSCH-PowerControl list 0 is determined as the pathloss reference RS of power control parameter set 0, while the RS resource whose PUSCH-PathlossReferenceRS-Id is mapped to the SRI- PUSCH-PowerControl with Id=0 in SRI-PUSCH-PowerControl list 1 is determined as the pathloss reference RS of power control parameter set 1.

For example, as shown in Table 7, SRI-PUSCH-PowerControl list 0, which is associated with the SRS resource set with lower index, consists of SRI-PUSCH-PowerControls with Ids 0, 1, 2 and 3, while SRI-PUSCH-PowerControl list 1, which is associated with the SRS resource set with higher index, consists of extra SRI-PUSCH-PowerControls with Ids 0, 1, 2 and 3. The RS resource whose PUSCH-PathlossReferenceRS-Id is mapped to SRI-PUSCH-PowerControl 0 (i.e. SRI-PUSCH-PowerControl with Id=0 in SRI-PUSCH-PowerControl list 0) is determined as the pathloss reference RS of power control parameter set 0, while the RS resource whose PUSCH-PathlossReferenceRS-Id is mapped to extra SRI-PUSCH-PowerControl 0 (i.e. SRI-PUSCH-PowerControl with Id=0 in SRI-PUSCH-PowerControl list 1) is determined as the pathloss reference RS of power control parameter set 1.

TABLE 7

| SRI-PUSCH-PowerControl list 0-associated with SRS resource set with lower index | SRI-PUSCH-PowerControl list 1-associated with SRS resource set with higher index |
| --- | --- |
| SRI-PUSCH-PowerControl 0 | extra SRI-PUSCH-PowerControl 0 |
| SRI-PUSCH-PowerControl 1 | extra SRI-PUSCH-PowerControl 1 |
| SRI-PUSCH-PowerControl 2 | extra SRI-PUSCH-PowerControl 2 |
| SRI-PUSCH-PowerControl 3 | extra SRI-PUSCH-PowerControl 3 |

Option 2 of Determining Pathloss Reference RS in Case 3:

According to Alternative 2, only one SRI-PUSCH-PowerControl list (e.g. SRI-PUSCH-PowerControl list 0) is configured. Each SRI-PUSCH-PowerControl in the SRI-PUSCH-PowerControl list is associated with one SRS resource set (e.g. a SRS resource set with lower index, or a SRS resource set with higher index) of the two SRS resource sets, either according to a predefined rule or configured by a RRC signaling. The RS resource whose PUSCH-PathlossReferenceRS-Id is mapped to the SRI-PUSCH-PowerControl with the lowest Id associated with the SRS resource set with one SRS resource set (e.g. the SRS resource set with lower index) of the two SRS resource sets is determined as the pathloss reference RS of power control parameter set 0, while the RS resource whose PUSCH-PathlossReferenceRS-Id is mapped to the SRI-PUSCH-PowerControl with the lowest Id associated with the SRS resource set with the other SRS resource set (e.g. the SRS resource set with higher index) of the two SRS resource sets is determined as the pathloss reference RS of power control parameter set 1.

For example, as shown in Table 8, SRI-PUSCH-PowerControl list 0 consists of SRI-PUSCH-PowerControls with Ids 0, 1, 2, 3, 4, 5, 6 and 7, while SRI-PUSCH-PowerControls with Ids 0, 1, 2 and 3 are associated with the SRS resource set with higher index, and SRI-PUSCH-PowerControls with Ids 4, 5, 6 and 7 are associated with the SRS resource set with lower index. The RS resource whose PUSCH-PathlossReferenceRS-Id is mapped to SRI-PUSCH-PowerControl 4 (i.e. the SRI-PUSCH-PowerControl with the lowest Id associated with the SRS resource set with lower index) is determined as the pathloss reference RS of power control parameter set 0, and the RS resource whose PUSCH-PathlossReferenceRS-Id is mapped to SRI-PUSCH-PowerControl 0 (i.e. the SRI-PUSCH-PowerControl with the lowest Id associated with the SRS resource set with higher index) is determined as the pathloss reference RS of power control parameter set 1.

TABLE 8

| SRI-PUSCH-PowerControl list 0 | |
| --- | --- |
| SRI-PUSCH-PowerControl 0 | associated with SRS resource set with higher index |
| SRI-PUSCH-PowerControl 1 | associated with SRS resource set with higher index |
| SRI-PUSCH-PowerControl 2 | associated with SRS resource set with higher index |
| SRI-PUSCH-PowerControl 3 | associated with SRS resource set with higher index |
| SRI-PUSCH-PowerControl 4 | associated with SRS resource set with lower index |
| SRI-PUSCH-PowerControl 5 | associated with SRS resource set with lower index |
| SRI-PUSCH-PowerControl 6 | associated with SRS resource set with lower index |
| SRI-PUSCH-PowerControl 7 | associated with SRS resource set with lower index |

Option 3 of Determining Pathloss Reference RS in Case 3:

According to Alternative 3, only one SRI-PUSCH-PowerControl list (e.g. SRI-PUSCH-PowerControl list 0) is configured. Two SRI-PUSCH-PathlossReferenceRS Ids are configured for each SRI-PUSCH-PowerControl in the one SRI-PUSCH-PowerControl list. Each SRI-PUSCH-PathlossReferenceRS per SRI-PUSCH-PowerControl Id is associated with one SRS resource set (e.g. a SRS resource set with lower index, or a SRS resource set with higher index) of the two SRS resource sets, either according to a predefined rule or configured by a RRC signaling. A first SRI-PUSCH-PathlossReferenceRS per SRI-PUSCH-PowerControl Id is associated with one SRS resource set (e.g. the SRS resource set with lower index), and a second SRI-PUSCH-PathlossReferenceRS per SRI-PUSCH-PowerControl Id is associated with the other SRS resource set (e.g. the SRS resource set with higher index). The RS resource whose PUSCH-PathlossReferenceRS-Id is mapped to the first SRI-PUSCH-PathlossReferenceRS of SRI-PUSCH-PowerControl with Id=0 is determined as the pathloss reference RS of power control parameter set 0, and the RS resource whose PUSCH-PathlossReferenceRS-Id is mapped to the second SRI-PUSCH-PathlossReferenceRS of SRI-PUSCH-PowerControl with Id=0 is determined as the pathloss reference RS of power control parameter set 1.

For example, as shown in Table 9, SRI-PUSCH-PowerControl list 0 consists of SRI-PUSCH-PowerControls with Ids 0, 1, 2 and 3. Each SRI-PUSCH-PowerControl m (m=0, 1, 2 or 3)) is configured with two SRI-PUSCH-PathlossReferenceRSs m0 and m1. Each SRI-PUSCH-PathlossReferenceRS m0 is associated with one SRS resource set (e.g. the SRS resource set with lower index), and each SRI-PUSCH-PathlossReferenceRS m1 is associated with the other SRS resource set (e.g. the SRS resource set with higher index). The RS resource whose PUS CH-PathlossReferenceRS-Id is mapped to SRI-PUSCH-PathlossReferenceRS 00 (i.e. the first SRI-PUSCH-PathlossReferenceRS of SRI-PUSCH-PowerControl with Id=0 is determined as the pathloss reference RS of power control parameter set 0, and the RS resource whose PUSCH-PathlossReferenceRSR-Id is mapped to SRI-PUSCH-PathlossReferenceRS 01 (i.e. the second SRI-PUSCH-PathlossReferenceRS of SRI-PUSCH-PowerControl with Id=0 is determined as the pathloss reference RS of power control parameter set 1.

TABLE 9

| SRI-PUSCH-PowerControl list 0 | | |
| --- | --- | --- |
| SRI-PUSCH-PowerControl 0 | SRI-PUSCH-PathlossReferenceRS 00 | associated with SRS resource set with lower index |
| | SRI-PUSCH-PathlossReferenceRS 01 | associated with SRS resource set with higher index |
| SRI-PUSCH-PowerControl 1 | SRI-PUSCH-PathlossReferenceRS 10 | associated with SRS resource set with lower index |
| | SRI-PUSCH-PathlossReferenceRS 11 | associated with SRS resource set with higher index |
| SRI-PUSCH-PowerControl 2 | SRI-PUSCH-PathlossReferenceRS 20 | associated with SRS resource set with lower index |
| | SRI-PUSCH-PathlossReferenceRS 21 | associated with SRS resource set with higher index |
| SRI-PUSCH-PowerControl 3 | SRI-PUSCH-PathlossReferenceRS 30 | associated with SRS resource set with lower index |
| | SRI-PUSCH-PathlossReferenceRS 31 | associated with SRS resource set with higher index |

3. Closed Loop Index:

Closed loop index is used to indicate one index of two close loops. Two closed loop indices (e.g. 0 and 1) are associated with two SRS resource sets, either according to a predefined rule or configured by a RRC signaling. For example, closed loop index 0 is associated with one SRS resource set (e.g. the SRS resource set with lower index), and closed loop index 1 is associated with the other SRS resource set (e.g. the SRS resource set with higher index). Therefore, the closed loop index of power control parameter set 0 may be the closed loop index associated with one SRS resource set (e.g. the SRS resource set with lower index), e.g. 0, while the closed loop index of power control parameter set 1 may be the closed loop index associated with the other SRS resource set (e.g. the SRS resource set with higher index), e.g. 1. That is, the closed loop index of all the repetitions of the PUSCH transmission associated with the SRS resource set with lower index is determined as 0, while the closed loop index of all the repetitions of the PUSCH transmission associated with the SRS resource set with higher index is determined as 1.

As a whole, this disclosure discloses how to determine two power control parameter sets for a PUSCH transmission with repetition scheduled by a DCI that does not have SRI field. For the determination of the P0 value and the alpha value, two methods are proposed; for the determination of the pathloss reference RS, different methods are proposed for three cases; and for the determination of the closed loop index, closed loop index 0 and 1 are associated with different SRS resource sets.

FIG. 1 is a schematic flow chart diagram illustrating an embodiment of a method 100 according to the present application. In some embodiments, the method 100 is performed by an apparatus, such as a remote unit (e.g. UE). In certain embodiments, the method 100 may be performed by a processor executing program code, for example, a microcontroller, a microprocessor, a CPU, a GPU, an auxiliary processing unit, a FPGA, or the like.

The method 100 may include 102 receiving a DCI scheduling a PUSCH transmission with repetitions, a configuration information for the PUSCH transmission with repetitions, and a mapping pattern, wherein, the DCI does not include a SRI field, the configuration information indicates a first SRS resource set and a second SRS resource set that are associated with the PUSCH transmission, and the mapping pattern indicates with which SRS resource set each repetition is associated; 104 determining a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index; and 106 transmitting repetitions of the PUSCH transmission associated with the first SRS resource set according to the first power control parameter set, and transmitting repetitions of the PUSCH transmission associated with the second SRS resource set according to the second power control parameter set.

Three ways of determining the P0 value and the alpha value are disclosed.

In a first way of determining the P0 value and the alpha value, one P0-PUSCH-AlphaSet list is configured; the P0 value and the alpha value of the first power control parameter set are determined by the P0-PUSCH-AlphaSet with the lowest Id in the one P0-PUSCH-AlphaSet list; and the P0 value and the alpha value of the second power control parameter set are also determined by the P0-PUSCH-Alpha-Set with the lowest Id in the one P0-PUSCH-AlphaSet list.

In a second way of determining the P0 value and the alpha value, a first P0-PUSCH-AlphaSet list and a second P0-PUSCH-AlphaSet list are configured; the first P0-PUSCH-AlphaSet list is associated with one of the first SRS resource set and the second SRS resource set, and the second P0-PUSCH-AlphaSet list is associated with the other of the first SRS resource set and the second SRS resource set; the P0 value and the alpha value of the first power control parameter set are determined by the P0-PUSCH-AlphaSet with the lowest Id in the P0-PUSCH-AlphaSet list associated with the first SRS resource set; and the P0 value and the alpha value of the second power control parameter set are determined by P0-PUSCH-AlphaSet with the lowest Id in the P0-PUSCH-AlphaSet list associated with the second SRS resource set.

In a third way of determining the P0 value and the alpha value, one P0-PUSCH-AlphaSet list is configured; each P0-PUSCH-AlphaSet in the one P0-PUSCH-AlphaSet list is associated with one of the first SRS resource set and the second SRS resource set; the P0 value and the alpha value of the first power control parameter set are determined by the P0-PUSCH-AlphaSet with the lowest Id associated with the first SRS resource set; and the P0 value and the alpha value of the second power control parameter set are determined by the P0-PUSCH-AlphaSet with the lowest Id associated with the second SRS resource set.

Six ways of determining pathloss reference RS are disclosed.

In a first way of determining pathloss reference RS, when PUSCH-PathlossReferenceRS is configured and enableDefaultBeamPL-ForSRS-r16 is not configured, a first PUSCH-PathlossReferenceRS list and a second PUSCH-PathlossReferenceRS list are configured; the first PUSCH-PathlossReferenceRS list is associated with one of the first SRS resource set and the second SRS resource set, and the second PUSCH-PathlossReferenceRS list is associated with the other of the first SRS resource set and the second SRS resource set; the PUSCH-PathlossReferenceRS with Id value being equal to zero in the PUSCH-PathlossReferenc-eRS list associated with the first SRS resource set is determined as the pathloss reference RS of the first power control parameter set; and the PUSCH-PathlossReferenceRS with Id value being equal to zero in the PUSCH-PathlossRefer-enceRS list associated with the second SRS resource set is determined as the pathloss reference RS of the second power control parameter set.

In a second way of determining pathloss reference RS, when PUSCH-PathlossReferenceRS is configured and enableDefaultBeamPL-ForSRS-r16 is not configured, one PUSCH-PathlossReferenceRS list is configured; each PUSCH-PathlossReferenceRS in the one PUSCH-Pathloss-ReferenceRS list is associated with one of the first SRS resource set and the second SRS resource set; the PUSCH-PathlossReferenceRS with the lowest Id associated with the first SRS resource set is determined as the pathloss reference RS of the first power control parameter set; and the PUSCH-PathlossReferenceRS with the lowest Id associated with the second SRS resource set is determined as the pathloss reference RS of the second power control parameter set.

In a third way of determining pathloss reference RS, when PUSCH-PathlossReferenceRS and PUSCH-PathlossRefer-enceRS-r16 are not configured and enableDefaultBeamPL-ForSRS-r16 is configured, one pathloss reference RS is configured for each of the first SRS resource set and the second SRS resource set; the pathloss reference RS config-ured for the first SRS resource set is determined as the pathloss reference RS of the first power control parameter set; and the pathloss reference RS configured for the second SRS resource set is determined as the pathloss reference RS of the second power control parameter set.

In a fourth way of determining pathloss reference RS, when enablePLRS-UpdateForPUSCH-SRS-r16 is config-ured, two SRI-PUSCH-PowerControl lists are configured; each SRI-PUSCH-PowerControl list is associated with one of the first SRS resource set and the second SRS resource set; a RS resource whose PUSCH-PathlossReferenceRS-Id is mapped to the SRI-PUSCH-PowerControl with Id value being equal to zero in the SRI-PUSCH-PowerControl list associated with the first SRS resource set is determined as the pathloss reference RS of the first power control param-eter set; and a RS resource whose PUSCH-PathlossRefer-enceRS-Id is mapped to the SRI-PUSCH-PowerControl with Id value being equal to zero in the SRI-PUSCH-PowerControl list associated with the second SRS resource set is determined as the pathloss reference RS of the second power control parameter set.

In a fifth way of determining pathloss reference RS, when enablePLRS-UpdateForPUSCH-SRS-r16 is configured, one SRI-PUSCH-PowerControl list is configured; each SRI-PUSCH-PowerControl in the one SRI-PUSCH-PowerCon-trol list is associated with one of the first SRS resource set and the second SRS resource set; a RS resource whose PUSCH-PathlossReferenceRS-Id is mapped to the SRI-PUSCH-PowerControl with the lowest Id associated with the first SRS resource set is determined as the pathloss reference RS of the first power control parameter set; and a RS resource whose PUSCH-PathlossReferenceRS-Id is mapped to the SRI-PUSCH-PowerControl with the lowest Id associated with the second SRS resource set is determined as the pathloss reference RS of the second power control parameter set.

In a sixth way of determining pathloss reference RS, when enablePLRS-UpdateForPUSCH-SRS-r16 is configured, one SRI-PUSCH-PowerControl list is configured; two SRI-PUSCH-PathlossReferenceRS Ids are configured for each SRI-PUSCH-PowerControl in the one SRI-PUSCH-Power-Control list; each SRI-PUSCH-PathlossReferenceRS Id is associated with one of the first SRS resource set and the second SRS resource set; a RS resource whose PUSCH-PathlossReferenceRS-Id is mapped to the SRI-PUSCH-PathlossReferenceRS of the SRI-PUSCH-PowerControl with Id value being equal to zero associated with the first SRS resource set is determined as the pathloss reference RS of the first power control parameter set; and a RS resource whose PUSCH-PathlossReferenceRS-Id is mapped to the SRI-PUSCH-PathlossReferenceRS of the SRI-PUSCH-PowerControl with Id value being equal to zero associated with the second SRS resource set is determined as the pathloss reference RS of the second power control parameter set.

One way of determining the closed loop index is disclosed: the closed loop index of the first power control parameter set is a closed loop index associated with the first SRS resource set; and the closed loop index of the second power control parameter set is a closed loop index associated with the second SRS resource set that is different from the closed loop index associated with the first SRS resource set.

FIG. 2 is a schematic flow chart diagram illustrating an embodiment of a method 200 according to the present application. In some embodiments, the method 200 is performed by an apparatus, such as a base unit. In certain embodiments, the method 200 may be performed by a processor executing program code, for example, a microcontroller, a microprocessor, a CPU, a GPU, an auxiliary processing unit, a FPGA, or the like.

The method 200 may include 202 transmitting a DCI scheduling a PUSCH transmission with repetitions, a configuration information for the PUSCH transmission with repetitions, and a mapping pattern, wherein, the DCI does not include a SRI field, the configuration information indicates a first SRS resource set and a second SRS resource set that are associated with the PUSCH transmission, and the mapping pattern indicates with which SRS resource set each repetition is associated; 204 determining a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index; and 206 receiving repetitions of the PUSCH transmission associated with the first SRS resource set according to the first power control parameter set, and receiving repetitions of the PUSCH transmission associated with the second SRS resource set according to the second power control parameter set.

Three ways of determining the P0 value and the alpha value have been described as above. Six ways of determining pathloss reference RS have been described as above. One way of determining the closed loop index has been described as above.

FIG. 3 is a schematic block diagram illustrating apparatuses according to one embodiment.

Referring to FIG. 3, the UE (i.e. the remote unit) includes a processor, a memory, and a transceiver. The processor implements a function, a process, and/or a method which are proposed in FIG. 1.

The UE comprises a receiver that receives a DCI scheduling a PUSCH transmission with repetitions, wherein the DCI does not include a SRI field, receives a configuration information for the PUSCH transmission with repetitions, wherein the configuration information indicates a first SRS resource set and a second SRS resource set that are associated with the PUSCH transmission, and receives a mapping pattern that indicates with which SRS resource set each repetition is associated; a processor that determines a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index; and a transmitter that transmits repetitions of the PUSCH transmission associated with the first SRS resource set according to the first power control parameter set, and transmits repetitions of the PUSCH transmission associated with the second SRS resource set according to the second power control parameter set.

Three ways of determining the P0 value and the alpha value have been described as above. Six ways of determining pathloss reference RS have been described as above. One way of determining the closed loop index has been described as above.

The gNB (i.e. the base unit) includes a processor, a memory, and a transceiver. The processor implements a function, a process, and/or a method which are proposed in FIG. 2.

The base unit comprises a transmitter that transmits a DCI scheduling a PUSCH transmission with repetitions, wherein the DCI does not include a SRI field, transmits a configuration information for the PUSCH transmission with repetitions, wherein the configuration information indicates a first SRS resource set and a second SRS resource set that are associated with the PUSCH transmission, and transmits a mapping pattern that indicates with which SRS resource set each repetition is associated, a processor that determines a first power control parameter set according to the first SRS resource set and a second power control parameter set according to the second SRS resource wherein each of the first power control parameter set and the second power control parameter set is composed of a P0 value, an alpha value, a pathloss reference RS and a closed loop index, and a receiver that receives repetitions of the PUSCH transmission associated with the first SRS resource set according to the first power control parameter set, and receives repetitions of the PUSCH transmission associated with the second SRS resource set according to the second power control parameter set.

Three ways of determining the P0 value and the alpha value have been described as above. Six ways of determining pathloss reference RS have been described as above. One way of determining the closed loop index has been described as above.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated in the appended claims rather than by the foregoing description. All changes which come within the meaning and range of equivalency of the claims are to be embraced within their scope.

The invention claimed is:

1. A method performed at a user equipment (UE), comprising:

receiving a Downlink Control Information (DCI) scheduling a Physical Uplink Shared Channel (PUSCH) transmission with repetitions, a configuration information for the PUSCH transmission with repetitions, and a mapping pattern, wherein the DCI does not include a Sounding Reference Signal (SRS) resource indicator (SRI) field, the configuration information indicates a first SRS resource set and a second SRS resource set that are associated with the PUSCH transmission, and the mapping pattern indicates with which SRS resource set each repetition is associated;

determining a first power control parameter set according to the first SRS resource set and a second power control parameter set according to the second SRS resource set wherein each of the first power control parameter set and the second power control parameter set is composed of a P0 value, an alpha value, a pathloss reference Reference Signal (RS) and a closed loop index; and transmitting repetitions of the PUSCH transmission associated with the first SRS resource set according to the first power control parameter set, and transmitting repetitions of the PUSCH transmission associated with the second SRS resource set according to the second power control parameter set.

2. The method of claim 1, wherein, when enablePLRS-UpdateForPUSCH-SRS-r16 is configured, two SRI-PUSCH-PowerControl lists are configured;

each SRI-PUSCH-PowerControl list is associated with one of the first SRS resource set and the second SRS resource set;

a RS resource whose PUSCH-PathlossReferenceRS-Id is mapped to a SRI-PUSCH-PowerControl with Id value being equal to zero in the SRI-PUSCH-PowerControl list associated with the second SRS resource set is determined as the pathloss reference RS of the second power control parameter set.

3. The method of claim 1, wherein, when enablePLRS-UpdateForPUSCH-SRS-r16 is configured, two SRI-PUSCH-PowerControl lists are configured;

each SRI-PUSCH-PowerControl list is associated with one of the first SRS resource set and the second SRS resource set;

a RS resource whose PUSCH-PathlossReferenceRS-Id is mapped to a SRI-PUSCH-PowerControl with Id value being equal to zero in the SRI-PUSCH-PowerControl list associated with the first SRS resource set is determined as the pathloss reference RS of the first power control parameter set; and a RS resource whose PUSCH-PathlossReferenceRS-Id is mapped to a SRI-PUSCH-PowerControl with Id value being equal to zero in the SRI-PUSCH-PowerControl list associated with the second SRS resource set is determined as the pathloss reference RS of the second power control parameter set.

4. A user equipment (UE) for wireless communication, comprising:

at least one memory; and at least one processor coupled with the at least one memory and configured to cause the UE to:

receive a Downlink Control Information (DCI) scheduling a Physical Uplink Shared Channel (PUSCH) transmission with repetitions, wherein the DCI does not include a Sounding Reference Signal (SRS) resource indicator (SRI) field;

receive a configuration information for the PUSCH transmission with repetitions, wherein the configuration information indicates a first SRS resource set and a second SRS resource set that are associated with the PUSCH transmission;

receive a mapping pattern that indicates with which SRS resource set each repetition is associated;

determine a first power control parameter set according to the first SRS resource set and a second power control parameter set according to the second SRS resource set wherein each of the first power control parameter set and the second power control parameter set is composed of a P0 value, an alpha value, a pathloss reference Reference Signal (RS) and a closed loop index;

transmit repetitions of the PUSCH transmission associated with the first SRS resource set according to the first power control parameter set; and transmit repetitions of the PUSCH transmission associated with the second SRS resource set according to the second power control parameter set.

5. The UE of claim 4, wherein, wherein, when PUSCH-PathlossReferenceRS and PUSCH-PathlossReferenceRS-r16 are not configured and enableDefaultBeamPL-ForSRS-r16 is configured, one pathloss reference RS is configured for each of the first SRS resource set and the second SRS resource set;

the pathloss reference RS configured for the first SRS resource set is determined as the pathloss reference RS of the first power control parameter set; and the pathloss reference RS configured for the second SRS resource set is determined as the pathloss reference RS of the second power control parameter set.

6. The UE of claim 4, wherein, one P0-PUSCH-AlphaSet list is configured;

the P0 value and the alpha value of the first power control parameter set are determined by a P0-PUSCH-Alpha-Set with a lowest Id in the one P0-PUSCH-AlphaSet list; and the P0 value and the alpha value of the second power control parameter set are also determined by the P0-PUSCH-AlphaSet with the lowest Id in the one P0-PUSCH-AlphaSet list.

7. The UE of claim 4, wherein, a first P0-PUSCH-AlphaSet list and a second P0-PUSCH-AlphaSet list are configured;

the first P0-PUSCH-AlphaSet list is associated with one of the first SRS resource set and the second SRS resource set, and the second P0-PUSCH-AlphaSet list is associated with another of the first SRS resource set and the second SRS resource set;

the P0 value and the alpha value of the first power control parameter set are determined by a P0-PUSCH-Alpha-Set with a lowest Id in the P0-PUSCH-AlphaSet list associated with the first SRS resource set; and the P0 value and the alpha value of the second power control parameter set are determined by a P0-PUSCH-AlphaSet with a lowest Id in the P0-PUSCH-AlphaSet list associated with the second SRS resource set.

8. The UE of claim 4, wherein, one P0-PUSCH-AlphaSet list is configured;

each P0-PUSCH-AlphaSet in the one P0-PUSCH-Alpha-Set list is associated with one of the first SRS resource set and the second SRS resource set;

the P0 value and the alpha value of the first power control parameter set are determined by a P0-PUSCH-Alpha-Set with a lowest Id associated with the first SRS resource set; and the P0 value and the alpha value of the second power control parameter set are determined by a P0-PUSCH-AlphaSet with a lowest Id associated with the second SRS resource set.

9. The UE of claim 4, wherein, when PUSCH-Pathloss-ReferenceRS is configured and enableDefaultBeamPU-ForSRS-r16 is not configured, a first PUSCH-PathlossReferenceRS list and a second PUSCH-PathlossReferenceRS list are configured;

the first PUSCH-PathlossReferenceRS list is associated with one of the first SRS resource set and the second SRS resource set, and the second PUSCH-PathlossRef-erenceRS list is associated with another of the first SRS resource set and the second SRS resource set;

the PUSCH-PathlossReferenceRS with Id value being equal to zero in the PUSCH-PathlossReferenceRS list associated with the first SRS resource set is determined as the pathloss reference RS of the first power control parameter set; and the PUSCH-PathlossReferenceRS with Id value being equal to zero in the PUSCH-PathlossReferenceRS list associated with the second SRS resource set is determined as the pathloss reference RS of the second power control parameter set.

10. The UE of claim 4, wherein, when PUSCH-Pathloss-ReferenceRS is configured and enableDefaultBeamPL-ForSRS-r16 is not configured, one PUSCH-PathlossReferenceRS list is configured;

each PUSCH-PathlossReferenceRS in the one PUSCH-PathlossReferenceRS list is associated with one of the first SRS resource set and the second SRS resource set;

the PUSCH-PathlossReferenceRS with a lowest Id associated with the first SRS resource set is determined as the pathloss reference RS of the first power control parameter set; and the PUSCH-PathlossReferenceRS with a lowest Id associated with the second SRS resource set is determined as the pathloss reference RS of the second power control parameter set.

11. The UE of claim 4, wherein, when enablePLRS-UpdateForPUSCH-SRS-r16 is configured, two SRI-PUSCH-PowerControl lists are configured;

each SRI-PUSCH-PowerControl list is associated with one of the first SRS resource set and the second SRS resource set;

a RS resource whose PUSCH-PathlossReferenceRS-Id is mapped to a SRI-PUSCH-PowerControl with Id value being equal to zero in the SRI-PUSCH-PowerControl list associated with the first SRS resource set is determined as the pathloss reference RS of the first power control parameter set; and a RS resource whose PUSCH-PathlossReferenceRS-Id is mapped to a SRI-PUSCH-PowerControl with Id value being equal to zero in the SRI-PUSCH-PowerControl list associated with the second SRS resource set is determined as the pathloss reference RS of the second power control parameter set.

12. The UE of claim 4, wherein, when enablePLRS-UpdateForPUSCH-SRS-r16 is configured, one SRI-PUSCH-PowerControl list is configured;

each SRI-PUSCH-PowerControl in the one SRI-PUSCH-PowerControl list is associated with one of the first SRS resource set and the second SRS resource set;

a RS resource whose PUSCH-PathlossReferenceRS-Id is mapped to the SRI-PUSCH-PowerControl with a lowest Id associated with the first SRS resource set is determined as the pathloss reference RS of the first power control parameter set; and a RS resource whose PUSCH-PathlossReferenceRS-Id is mapped to the SRI-PUSCH-PowerControl with a lowest Id associated with the second SRS resource set is determined as the pathloss reference RS of the second power control parameter set.

13. The UE of claim 4, wherein, when enablePLRS-UpdateForPUSCH-SRS-r16 is configured, one SRI-PUSCH-PowerControl list is configured;

two SRI-PUSCH-PathlossReferenceRS Ids are configured for each SRI-PUSCH-PowerControl in the one SRI-PUSCH-PowerControl list;

each SRI-PUSCH-PathlossReferenceRS Id is associated with one of the first SRS resource set and the second SRS resource set;

a RS resource whose PUSCH-PathlossReferenceRS-Id is mapped to the SRI-PUSCH-PathlossReferenceRS of the SRI-PUSCH-PowerControl with Id value being equal to zero associated with the first SRS resource set is determined as the pathloss reference RS of the first power control parameter set; and a RS resource whose PUSCH-PathlossReferenceRS-Id is mapped to the SRI-PUSCH-PathlossReferenceRS of the SRI-PUSCH-PowerControl with Id value being equal to zero associated with the second SRS resource set is determined as the pathloss reference RS of the second power control parameter set.

14. The UE of claim 4, wherein, the closed loop index of the first power control parameter set is a closed loop index associated with the first SRS resource set; and the closed loop index of the second power control parameter set is a closed loop index associated with the second SRS resource set that is different from the closed loop index associated with the first SRS resource set.

15. A base unit for wireless communication, comprising:

at least one memory; and at least one processor coupled with the at least one memory and configured to cause the base unit to:

transmit a Downlink Control Information (DCI) scheduling a Physical Uplink Shared Channel (PUSCH) transmission with repetitions, wherein the DCI does not include a Sounding Reference Signal (SRS) resource indicator (SRI) field;

transmit a configuration information for the PUSCH transmission with repetitions, wherein the configuration information indicates a first SRS resource set and a second SRS resource set that are associated with the PUSCH transmission;

transmit a mapping pattern that indicates with which SRS resource set each repetition is associated;

determine a first power control parameter set according to the first SRS resource set and a second power control parameter set according to the second SRS resource wherein each of the first power control parameter set and the second power control parameter set is composed of a P0 value, an alpha value, a pathloss reference Reference Signal (RS) and a closed loop index;

receive repetitions of the PUSCH transmission associated with the first SRS resource set according to the first power control parameter set, and receive repetitions of the PUSCH transmission associated with the second SRS resource set according to the second power control parameter set.

16. A processor for wireless communication, comprising:

at least one controller coupled with at least one memory and configured to cause the processor to:

receive a Downlink Control Information (DCI) scheduling a Physical Uplink Shared Channel (PUSCH) transmission with repetitions, wherein the DCI does not include a Sounding Reference Signal (SRS) resource indicator (SRI) field;

receive a configuration information for the PUSCH transmission with repetitions, wherein the configuration information indicates a first SRS resource set and a second SRS resource set that are associated with the PUSCH transmission;

receive a mapping pattern that indicates with which SRS resource set each repetition is associated;

determine a first power control parameter set according to the first SRS resource set and a second power control parameter set according to the second SRS resource set wherein each of the first power control parameter set and the second power control parameter set is composed of a P0 value, an alpha value, a pathloss reference Reference Signal (RS) and a closed loop index;

transmit repetitions of the PUSCH transmission associated with the first SRS resource set according to the first power control parameter set; and transmit repetitions of the PUSCH transmission associated with the second SRS resource set according to the second power control parameter set.

17. The processor of claim 16, wherein, one P0-PUSCH-AlphaSet list is configured;

the P0 value and the alpha value of the first power control parameter set are determined by a P0-PUSCH-AlphaSet with a lowest Id in the one P0-PUSCH-AlphaSet list; and the P0 value and the alpha value of the second power control parameter set are also determined by the P0-PUSCH-AlphaSet with the lowest Id in the one P0-PUSCH-AlphaSet list.

18. The processor of claim 16, wherein, a first P0-PUSCH-AlphaSet list and a second P0-PUSCH-AlphaSet list are configured;

the first P0-PUSCH-AlphaSet list is associated with one of the first SRS resource set and the second SRS resource set, and the second P0-PUSCH-AlphaSet list is associated with another of the first SRS resource set and the second SRS resource set;

the P0 value and the alpha value of the first power control parameter set are determined by a P0-PUSCH-AlphaSet with a lowest Id in the P0-PUSCH-AlphaSet list associated with the first SRS resource set; and the P0 value and the alpha value of the second power control parameter set are determined by a P0-PUSCH-AlphaSet with a lowest Id in the P0-PUSCH-AlphaSet list associated with the second SRS resource set.

19. The processor of claim 16, wherein, one P0-PUSCH-AlphaSet list is configured;

each P0-PUSCH-AlphaSet in the one P0-PUSCH-AlphaSet list is associated with one of the first SRS resource set and the second SRS resource set;

the P0 value and the alpha value of the first power control parameter set are determined by a P0-PUSCH-AlphaSet with a lowest Id associated with the first SRS resource set; and the P0 value and the alpha value of the second power control parameter set are determined by a P0-PUSCH-AlphaSet with a lowest Id associated with the second SRS resource set.

20. The processor of claim 16, wherein, when PUSCH-PathlossReferenceRS is configured and enableDefaultBeamPU-ForSRS-r16 is not configured, a first PUSCH-PathlossReferenceRS list and a second PUSCH-PathlossReferenceRS list are configured;

the first PUSCH-PathlossReferenceRS list is associated with one of the first SRS resource set and the second SRS resource set, and the second PUSCH-PathlossReferenceRS list is associated with another of the first SRS resource set and the second SRS resource set;

the PUSCH-PathlossReferenceRS with Id value being equal to zero in the PUSCH-PathlossReferenceRS list associated with the first SRS resource set is determined as the pathloss reference RS of the first power control parameter set; and the PUSCH-PathlossReferenceRS with Id value being equal to zero in the PUSCH-PathlossReferenceRS list associated with the second SRS resource set is determined as the pathloss reference RS of the second power control parameter set.

* * * * *